(12) United States Patent
Kilian

(10) Patent No.: US 8,780,189 B2
(45) Date of Patent: Jul. 15, 2014

(54) AUTOMATED WHEEL SLIDE DETECTOR

(75) Inventor: Krzysztof Piotr Kilian, Floreat (AU)

(73) Assignee: Lynx Engineering Consultants Pty Ltd., West Perth, W.A. (AU)

( * ) Notice: Subject to any disclaimer, the term of this patent is extended or adjusted under 35 U.S.C. 154(b) by 1185 days.

(21) Appl. No.: 12/029,215

(22) Filed: Feb. 11, 2008

(65) Prior Publication Data

US 2008/0192113 A1    Aug. 14, 2008

Related U.S. Application Data

(63) Continuation of application No. 10/479,124, filed as application No. PCT/AU02/00680 on May 28, 2002, now abandoned.

(30) Foreign Application Priority Data

May 28, 2001  (AU) ........................................ PR5299

(51) Int. Cl.
*H04N 7/18* (2006.01)
*G01N 21/86* (2006.01)
*G01B 11/26* (2006.01)

(52) U.S. Cl.
USPC .................... 348/61; 250/559.22; 356/139.09

(58) Field of Classification Search
USPC .................... 348/61, 92, 118, 148; 29/894.35; 76/865.8; 356/139.09, 139.06; 250/559.22
See application file for complete search history.

(56) References Cited

U.S. PATENT DOCUMENTS

| | | | | |
|---|---|---|---|---|
| 4,679,447 A | * | 7/1987 | Sieradzki et al. | ............. 73/865.8 |
| 4,798,963 A | * | 1/1989 | Wittkopp et al. | ........ 250/559.22 |
| 4,798,964 A | * | 1/1989 | Schmalfuss et al. | ..... 250/559.22 |
| 5,293,687 A | * | 3/1994 | Willoughby et al. | ...... 29/894.35 |
| 5,433,111 A | | 7/1995 | Hershey et al. | |
| 5,808,906 A | | 9/1998 | Sanchez-Revuelta et al. | |
| 6,269,297 B1 | | 7/2001 | Hosomi et al. | |
| 6,341,013 B1 | * | 1/2002 | Battiti et al. | ............. 356/139.09 |
| 6,404,486 B1 | * | 6/2002 | Nobis et al. | ............... 356/139.09 |
| 6,532,062 B2 | * | 3/2003 | Jackson et al. | ........... 356/139.09 |
| 2001/0011843 A1 | | 8/2001 | Makilaine et al. | |

FOREIGN PATENT DOCUMENTS

| | | |
|---|---|---|
| CA | 2 295 288 | 5/2007 |
| JP | 09-113227 | 5/1997 |
| WO | 01/23834 | 4/2001 |

OTHER PUBLICATIONS

Foreign patent document with English language abstract.

* cited by examiner

*Primary Examiner* — Gims Philippe
(74) *Attorney, Agent, or Firm* — Faegre Baker Daniels LLP

(57) ABSTRACT

A wheel slide detection system with at least one device, such as a camera, to capture an image of a wheel, and a processor to receive the captured image, identify the wheel, and to analyze the relative position of the wheel to determine whether or not the wheel is rotating. The system can detect rotation, non-rotation or partial rotation of the wheel. The camera(s) can be triggered by sensor-activation or microprocessor-activation. A visible or electronically encoded feature or marker on the wheel can be used as a reference for establishing wheel rotation. A processing algorithm can compare the location of the feature or marker on consecutive images to assess rotation of the wheel by determining an angle of rotation of the wheel.

28 Claims, 3 Drawing Sheets

AUTOMATED WHEEL SLIDE DETECTOR

This application is a continuation of Ser. No. 10/479,124 Feb. 25, 2004 now Abandoned which is a 371 of PCT/AU02/00680 May 28, 2002.

FIELD OF THE INVENTION

The present invention is directed towards a system that is able to detect when one or more wheels on a train are non-rotating or partially rotating.

BACKGROUND OF THE INVENTION

A known problem with trains, which can lead to disastrous results, is that on occasion whilst the train is travelling one or more wheels of the train do not rotate or rotate only partially. This usually occurs when the brake is applied. As the train travels, the non-rotating or sliding wheel slides along the rail, which in severe circumstances may lead to derailment of the train.

The brakes may be applied due to human error, for example the brakes may accidentally be left on by the operator. This happens most frequently with hand brakes, in which case some wheels may have a brake applied and lock up, while other wheels are rotating freely. Non-rotation of the wheels may also be caused by mechanical failure, for example failure of the pneumatic brakes, or collapse of the bearing preventing the wheel from rotating. In any case, failures would affect individual wheel sets or cars, and it is noted that in long trains this does not affect the ability of the train to travel. The reason for non-rotation or partial non-rotation may be varied, what is important is the detection of non-rotation or partial non-rotation.

If a wheel is not rotating, such that the wheel slides on the rail instead of rolling along it, the sliding wheel may develop a flat spot. The friction between the non-rotating wheel and the rail may cause the wheel to overheat. This in turn can cause the wheel to fracture, and a portion of the wheel may break off. In such cases, the axle of the fractured wheel may then become dislodged, damaged, or fractured, leading to derailment.

A derailed vehicle can damage infrastructure and rolling stock and also become a safety hazard for rail workers and the public. Non-rotating wheels may also cause other less catastrophic problems. For example, the rail head may be damaged, or the braking equipment may be damaged if non-rotation or partial rotation causes wheel flats which in turn may damage the brake blocks.

In order to guard against non-rotation or partial non-rotation of train wheels, it is currently necessary for a train examiner to stand next to the train as it travels past, and for the train examiner to conduct a visual check of the wheels. This can be referred to as roll-by inspection. It is vital that non-rotating wheels are detected during the time of inspection, as this is the only time that they can be checked. However, this method is not satisfactory, as a train examiner often fails to detect a wheel that does not rotate. This solution is also prone to human error, whether through inattentiveness, tiredness, poor visibility, boredom or any other reason.

OBJECT OF THE INVENTION

It is therefore an object of the present invention to provide an improved system for detection of non-rotating or partially rotating wheels on a train, which is not prone to human errors.

SUMMARY OF THE INVENTION

With the above object in mind, the present invention provides in one aspect a wheel slide detection system including:
an image capture means to capture an image of a wheel; and
a processing means to receive the captured image, identify the wheel and analyse the relative position of the wheel to determine whether the wheel is rotating.

Preferably a plurality of image capture means will be included, and also a plurality of images will be captured to enable relative comparison between each of the images.

In preferred arrangements the system would also include a trigger means to activate the system as a vehicle approaches, for example switch(es) and/or microprocessor generated electronic impuls(es), and also an illumination means to assist in the capturing of images.

In further preferred arrangements the image capture means uses a slow shutter or time lapse technique, thus, advantageously rotation, partial rotation or non-rotation of the wheel can be determined from a single image.

The system may also calculate the diameter of the wheel so as to assist in determining whether partial rotation of the wheel is occurring.

BRIEF DESCRIPTION OF THE DRAWINGS

It will be convenient to further describe the invention by reference to the accompanying drawings that illustrate possible embodiments of the invention. Other embodiments of the invention are possible and consequently the particularity of the accompanying drawings is not to be understood as superceding the generality of the preceding description of the invention.

DETAILED DESCRIPTION OF THE DRAWINGS

Figure 1:
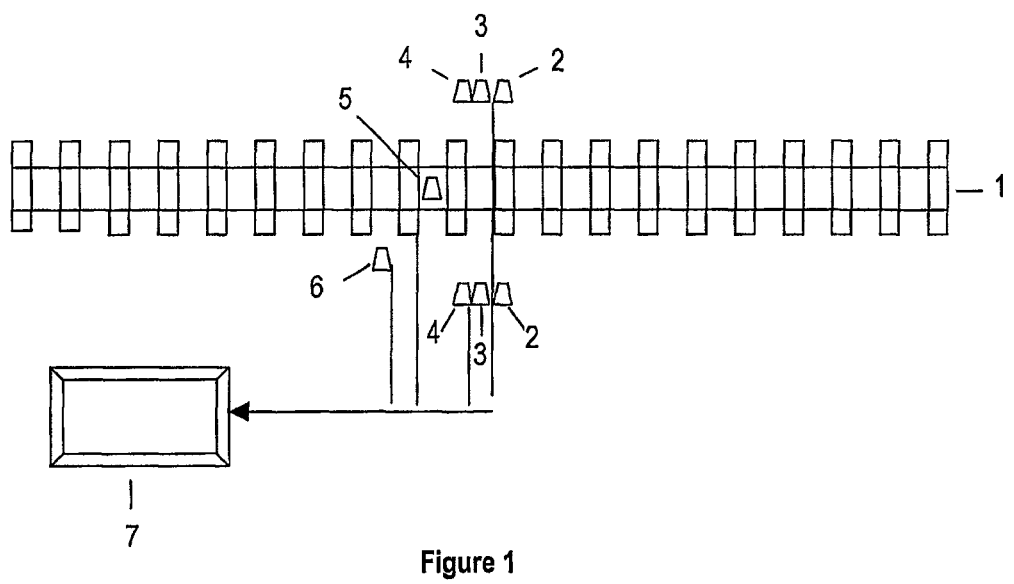
FIG. 1 shows the basic arrangement of the present invention.

The system of the present invention has been adapted to detect non-rotation or partial non-rotation of any of the wheels of a train in motion. As the system is designed to be automated, it may be located at any point along a track. In the preferred arrangement, the system may include at least one activation means or trigger. This activation means may take the form of proximity switches, lasers, optical sensors or the like, adapted to locate the moving train or wheels. In a simple arrangement, the trigger may simply be a switch located on the track and is activated by the passing of the train. Activation of the trigger tells the system that a train is approaching and that image capturing should commence.

The usual configuration of a train is that the wheels come in a wheel set, such that each set consists of two wheels, connected with a permanently fixed axle. Most wheel sets are designed to ensure that both wheels rotate at the same time and at the same rate. If a wheel on one side of the wheel set, i.e., one side of the train, is not rotating, then the other wheel of the wheel set is not rotating either. Accordingly, it is only necessary for the system of the present invention to be located on one side of the track if the wheel set is designed with a fixed axle that does not rotate. However, in some circumstances it may be desirable to locate the system on both sides of the track. This would allow the system to check the results of one side against the other side, or alternatively allows for inbuilt redundancy in the case of breakdowns or repairs. This would also enable the system to check for non-rotating or partially rotating wheels if the wheel set is designed in such a way that the wheels on the wheel set do not rotate at the same time.

In preferred arrangements the system may be directed to analysis of a single image taken by a single camera using a time lapse or slow shutter technique, whereby the camera's shutter is open over a prolonged period of time so that the trajectory of the marker or component is visible in the single image. The trajectory of the feature, marker or component will be seen as a single straight line if the wheel is not rotating. In the case of a time lapse image, the camera starts to take the image as soon as the trigger means is activated. The camera shutter remains open until the wheel travels a sufficient distance to enable the camera to capture the trajectory of the marker on the wheel on a single image. The length of the trajectory on the image must be longer than the length of the object being traced, the object being the marker, component or feature on the wheel. The camera shutter then closes and may start to take an image of the next wheel. The image of the previous wheel is then analysed by using edge definition or other techniques to determine if the trajectory indicates a non-rotating wheel (i.e. if the trajectory is a relatively straight line on the horizontal plane).

Alternatively, the system includes a plurality of image capture means such as a digital camera. These cameras are designed to capture pictures of the wheels of the trains, and may be fitted with automated iris control mechanisms, if required, to control the image quality, depending on the lighting conditions. Ideally, the camera should be calibrated to achieve high accuracy measurements. The images captured by the cameras would then be passed to the processing unit for analysis.

Depending on the location of the system, it may be preferable to include a lighting system. Ideally this lighting system would also be activated at the same time an oncoming train activates a trigger, or at the same time as the picture is taken by the camera. The number and location of the lights required may be dependent on the natural ambient light, and in a preferred arrangement, the processing unit will assess the lighting required based on the current ambient light and then illuminate the necessary number of lights.

The processing unit receives the captured images from the cameras and assesses whether the wheels are rotating. An image of each wheel is taken by the camera in a precise manner by using sensor-activated or microprocessor-activated triggering. A plurality of consecutive images is taken of the same wheel. The images are taken by one or more cameras. The video image processing establishes the center of the wheel by detecting the edges of the wheel and establishing the wheel's dimension. This step is important, as it provides the reference around which the rotation, or non-rotation, or partial rotation of the wheel is detected. The video image processing algorithm chooses a particular visible or electronically encoded feature or marker on each wheel as a reference for establishing rotation. The feature or marker is programmed into the video image processing algorithm. The video image processing algorithm compares the location of the feature or marker on consecutive images of the same wheel. The system may then assess the rotation of a wheel using by calculating the angle of the rotation of the wheel. In a basic configuration, the system may merely determine whether there has been any movement of the wheel, opposed to determining the angle of rotation. However, in such an arrangement the system would be unable to determine whether partial rotation or full rotation was present.

The plurality of cameras may be used to take a plurality of images of each wheel as the train passes. In an alternative arrangement, in some circumstances it may be possible to use a single camera to capture consecutive images of the wheel in such a way that it would still be able to show any relative motion of the wheel.

The system may analyse the captured images using image processing software such as MATLAB to determine whether a wheel is rotating by finding the location of a fixed visual or electronic feature or marker on the wheel and then calculating the angle of rotation of the wheel by following the path of travel of this feature or marker. The system may be adapted to analyse a distinctive component on the wheel, such as a bolt, or may be adapted to locate and track a specially applied feature or marker added to the wheel. The feature or marker could be of any size, shape, colour or pattern, and may also be mechanical or electronic. What is required, is that the component, feature, or marker, whether a part of the wheel, or added to the wheel is able to be detected and tracked by the system.

Successful detecting of non-rotating or partially rotating wheels depends on identifying the centre of the wheel, which can be derived by analysing the image. The center of the wheel can be derived by edge detection algorithms that find the outer edges of the wheel or of any other round component of the wheel, such as an end cap, or by finding the end cap bolt group whereby each bolt is located at an equal distance from the center of the wheel. Other features or components of the wheel may be used in certain circumstances to establish the location of the center of the wheel. Furthermore, the markers or permanent features have to be identified. At least two images are taken of each wheel, as at least two images are required for detection. The first image will show the location of the wheel centre and the markers, or any other distinctive features, on the wheel. The second image will then show the location of the wheel centre and the markers. If the wheel is rotating, the position of the markers in the first and second images will be different.

Figure 3:
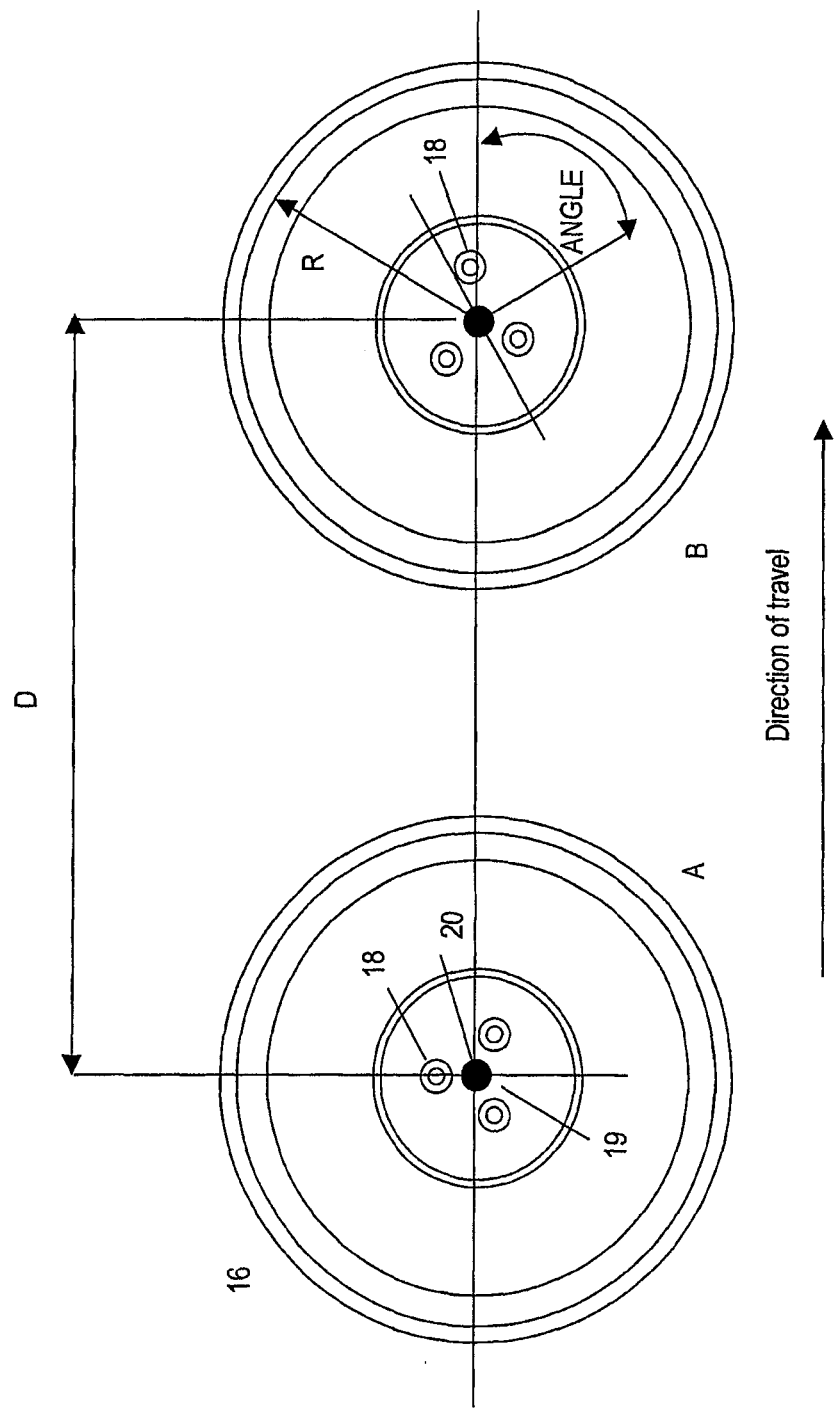
FIG. 3 shows an example for determining wheel rotation.

For example, if we consider an example using end cap bolts, which are distinctive features on the wheel as shown in FIG. 3, we are able to check for rotation. The end cap bolts 18 are fixed to the axle 19 and are visible from either side of the train. The bolts 18 are affixed in a circular arrangement around the centre 20 of the wheel 16 usually 120° apart in the case of 3 end cap bolts. The camera takes two images A, B in a known period of time. The first image A is used to locate the centre 20 of the wheel 16 and the initial location of the end cap bolts 18. The second image B is used to find the location of the centre 20 of the wheel 16 and the bolts 18 after a known period of time. In this example, the second picture B is taken at a time when the bolts 18 will travel less than 120°, so that one bolt does not overlay another bolt on a second image. Each bolt may be identified by its unique feature, such as its shape and size. However, there is no need to identify each bolt if the travel is less than 120°, as this means that one bolt will not overlay any other bolt in the subsequent image. By comparing the location of the bolts on the first and second images, the angle of rotation of the bolts in this example may be established. This angle of rotation is compared with the expected angle of rotation, assuming we are able to determine the radius R of the wheel. The radius is determined by finding the center of each wheel and referencing it to the top of the rail. The expected angle of rotation may be determined by using the following equation:

Angle of wheel rotation=(D/R)×(360/2×Π)

Where

D=Distance traveled by wheel

R=Radius (of wheel)

Π=3.14159 (mathematical constant)

The actual angle of rotation may be compared to the expected angle of rotation. If the actual angle is less than the expected angle then the wheel is not rotating or is only partially rotating.

In the preferred arrangement the system uses the radius of the wheel to calculate the anticipated rotation of the fixed components, features or markers and to compare it with the actual rotation. In this way, the system is able to detect for partial rotation. Whilst partial rotation may not be a significant problem in terms of train safety, it does have repercussions in terms of maintenance and replacement costs of components such as brake pads. Partial rotation may also damage the wheels.

Should a non-rotating, or partially rotating wheel be detected, the system should provide a warning to the operator to this effect. The warning may be sent by radio or any other available type of transmission to the train driver or any other responsible person. The preferred means of warning the train driver is by sending a warning message over the radio, as this is the most immediate. In the alternative, or concurrently, a warning message may also be sent to train control. It is envisaged that this warning will also be sent by radio or LAN, although any other method of communication may also be used. Depending on arrangements in place, the warning message may also be sent by any communication means to a computer, telephone or any other recipient or device.

Figure 2:
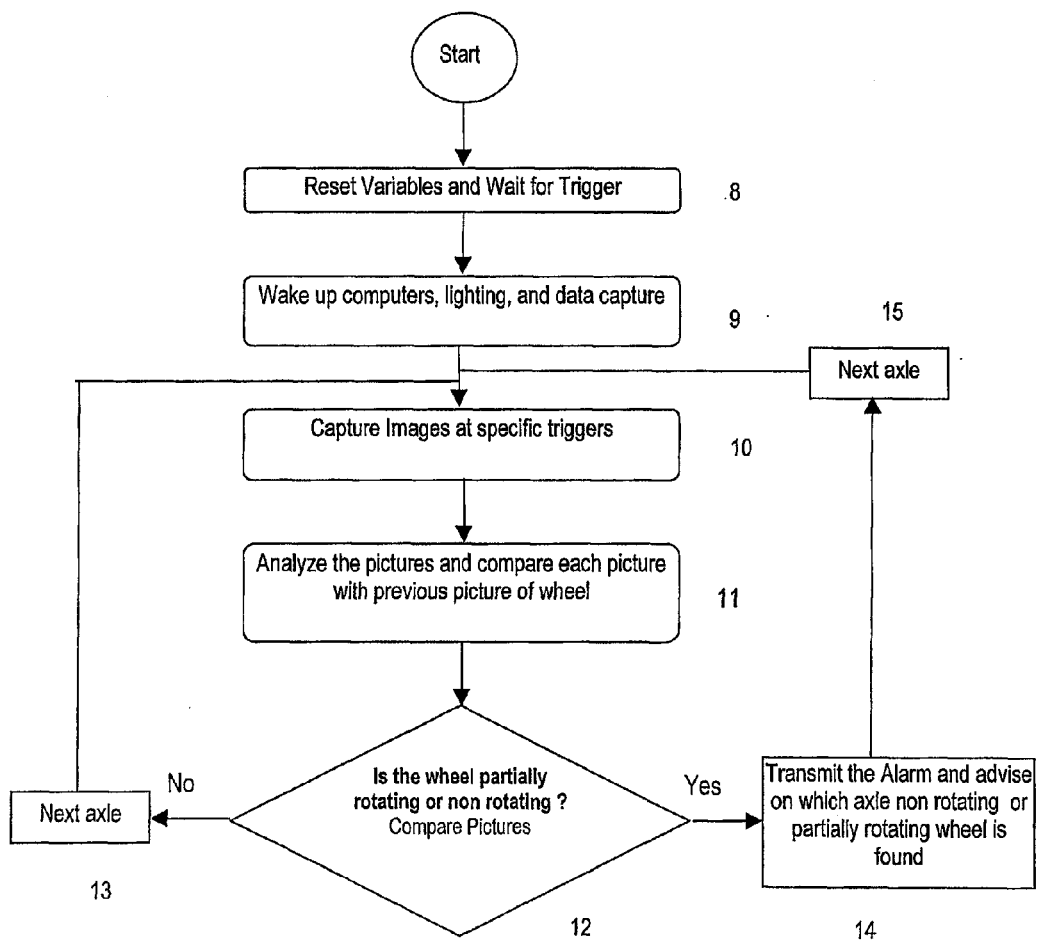
FIG. 2 shows a possible process arrangement of the present invention.

The system may be configured using a combination of hardware and software as shown in FIGS. 1 and 2. One or more triggering means 5, 6 may be located adjacent the track 1, together with cameras 3 and lights 4. The data from these devices may then be transferred to a processing or main unit 7 which may be located adjacent the track 1 or in a location remote from the track. The main unit 7 would be configured to monitor the trigger devices 5, 6 located adjacent the track 1. When the trigger 5, 6 is activated, a signal is sent to the main unit 7 which then activates the lighting 4 if necessary and prepares the cameras 3 to capture the images.

Data from the cameras 3 will then be passed to the main unit 7 together with any references from the triggering devices 5, 6 or any other devices that can be used to reference the pictures. Similarly, the captured images are analysed and compared to determine whether the wheel is rotating.

If the system detects that the wheel is rotating, then the next wheel or axle is considered. Should the system determine that the wheel is not rotating, or in some circumstances only partially rotating, then an alarm or alert may be sounded.

Ideally when a non-rotating or partially rotating wheel is detected, the system will identify which wheel is non-rotating or partially rotating and forward this information to the desired recipients. The system would then also check the next wheel.

The software controlling the system may be installed on the main unit 7. The main unit 7 can include a central processing unit, a digital signal processor, video capture cards, trigger control software, and image processing software. On startup or following processing of a previous wheel, the main unit 7 resets the system variables and waits for the trigger to be activated 8. If the trigger 5, 6 is activated, a signal is sent to the main unit 7, the main unit 7 then activates the processing unit 9, and as necessary turns on the lighting 4 and data capture means 2, 3.

The system then captures 10 the video data with reference to the triggers. The main unit 7 then analyses 11 this data comparing it with expected results so as to determine whether the wheel is rotating 12. If the wheel is rotating, then the system considers the next axle 13 and repeats the process of capturing the image 10 and analysing the data 11. If the wheel is not rotating or partially rotating then an alarm is transmitted 14 before the system then considers the next wheel 15. Once all the wheels have been analysed, the system is then able to reset and await a further trigger.

The present invention discloses an automated wheel slide detection system. This system includes computer hardware and software that may be installed at any location near the track, and uses image assessment to detect whether a wheel is rotating.

As soon as a non-rotating or partially rotating wheel is detected, the system preferably issues a warning (audio and/or visual) and may send a warning message to a recipient (for example, to the train driver or to the train controller). This message can be sent by any convenient means (such as radio, SMS, internet). The system ideally identifies the location of the sliding wheel either by reference to the axle or vehicle. The train can then be stopped, and appropriate action can be taken by the railway operator.

The wheel slide detection system can be fully automatic and enables every wheel that goes past to be checked. As a result, wheels that do not rotate and may cause an accident are flagged as soon as they have passed the wheel slide detector and a warning is issued to a suitable recipient. Because of the system's automation feature, it can be installed anywhere along the track. Automation also makes it more reliable and consistent than employing a human train examiner.

Whilst the system of the present invention has been summarised and explained it will be appreciated by those skilled in the art that many widely varying embodiments and applications are within the teaching and scope of the present invention, and that the examples presented herein are by way of illustration only and should not be construed as limiting the scope of this invention.

The invention claimed is:

1. A railway vehicle wheel slide detection system including:
   an image capture means to capture a plurality of images of a wheel; and
   a processing means to receive at least two of said captured images, identify said wheel and analyze the at least two images, detect at least one component, feature, or marker on the wheel, whether a part of the wheel or added to the wheel, and compare the relative positions of the at least one component, feature or marker in said at least two images to detect a difference in position of the at least one component, feature or marker to determine whether said wheel is rotating or not rotating.

2. A system as claimed in claim 1, wherein a plurality of image capture means are included.

3. A system as claimed in claim 1, wherein the comparison is made between consecutive captured images.

4. A system as claimed in claim 1, further including a trigger means to activate said image capture means.

5. A system as claimed in claim 4, wherein said trigger means is a switch or an electronic impulse generated by a microprocessor.

6. A system as claimed in claim 5 further including at least one additional trigger means to provide at least one reference point for said processing means.

7. A system as claimed in claim 1 wherein said image capture means is a camera.

8. A system as claimed in claim 7, wherein said camera includes automated iris control mechanisms adapted to adjust to varying lighting conditions.

9. A system as claimed in claim 1 further including a lighting means to illuminate said wheel.

10. A system as claimed in claim 9, further including a lighting control means to adjust the illumination provided by said lighting means dependent on ambient conditions.

11. A system as claimed in claim 1, wherein to determine whether said wheel is rotating, said processing means identifies a fixed component, feature or marker on said wheel, and analyses the movement of said fixed component or feature to determine whether said wheel is rotating.

12. A system as claimed in claim 11, wherein the degree of rotation determined by said processing means is compared with expected rotation of said wheel to determine whether said wheel is partially or fully rotating.

13. A system as claimed in claim 12, wherein the expected angle of rotation is determined by $(D/R) \times (360/2 \times \pi)$
where D equals distance traveled by said wheel,
equal radius of said wheel, and
is a mathematical constant.

14. A system as claimed in claim 1, wherein the image capture means uses a slow shutter or time lapse technique.

15. A system as claimed claim 14, wherein to determine whether said wheel is rotating, said processing means identifies a fixed component, feature or marker on said wheel, and analyses the movement of said fixed component or feature to determine whether said wheel is rotating.

16. A system as claimed in claim 1 wherein if said processing means determines said wheel is not rotating, or is partially rotating, an alert or warning message is sent to at least one predetermined recipient.

17. A system as claimed in claim 1, wherein the processing means determines whether the wheel is partially rotating.

18. A method of detecting railway vehicle wheel slide, comprising:
capturing a plurality of images of a wheel of the vehicle;
analyzing the at least two images;
detecting at least one component, feature, or marker on the wheel, whether a part of the wheel or added to the wheel; and
comparing the relative positions of the at least one component, feature or marker in said at least two images to detect a difference in position of the at least one component, feature or maker to determine whether said wheel is or is not rotating.

19. A method according to claim 18, comprising comparing consecutive images of said captured images.

20. A method according to claim 18, wherein a fixed component, feature or marker on said wheel is identified, and the movement of said fixed component, feature or marker is analyzed to determine whether said wheel is rotating or not rotating.

21. A method according to claim 18, wherein a degree of rotation of said wheel is determined and compared with an expected rotation of said wheel to determine whether said wheel is partially or fully rotating.

22. A method according to claim 21, wherein an expected angle of rotation is determined by $(D/R) \times (360/2 \times \pi)$
where D equals distance traveled by said wheel,
R equals the radius of said wheel, and
$\pi$ is a mathematical constant.

23. A method according to claim 18, comprising capturing said image using slow shutter or time lapse technique.

24. A method according to claim 18, comprising sending an alert or warning to at least one predetermined recipient if said wheel is not rotating or is only partially rotating.

25. A method according to claim 18, comprising triggering an activation signal to initiate capturing said image.

26. A method according to claim 25, comprising triggering at least one additional to provide at least one reference point for processing said image.

27. A method according to claim 18, comprising automated iris control of an image capture means to adjust to varying lighting conditions.

28. A method according to claim 18, comprising illuminating said wheel when capturing of said image.

* * * * *